(12) United States Patent
Wang et al.

(10) Patent No.: US 10,577,101 B2
(45) Date of Patent: Mar. 3, 2020

(54) WATER SURFACE DETECTION METHOD AND APPARATUS, UNMANNED AERIAL VEHICLE LANDING METHOD AND APPARATUS AND UNMANNED AERIAL VEHICLE

(71) Applicant: AUTEL ROBOTICS CO., LTD., Shenzhen, Guangdong (CN)

(72) Inventors: Xu Wang, Guangdong (CN); Xipeng Cui, Guangdong (CN); Ning Jia, Guangdong (CN); Yu Song, Guangdong (CN)

(73) Assignee: AUTEL ROBOTICS CO., LTD., Shenzhen, Guangdong (CN)

( * ) Notice: Subject to any disclaimer, the term of this patent is extended or adjusted under 35 U.S.C. 154(b) by 15 days.

(21) Appl. No.: 15/850,555

(22) Filed: Dec. 21, 2017

(65) Prior Publication Data

US 2019/0193852 A1    Jun. 27, 2019

(51) Int. Cl.
```
G06K 9/00      (2006.01)
B64C 39/02     (2006.01)
B64D 47/08     (2006.01)
G06T 7/13      (2017.01)
G06T 7/529     (2017.01)
G06T 7/60      (2017.01)
```
(52) U.S. Cl.
CPC ............ *B64C 39/024* (2013.01); *B64D 47/08* (2013.01); *G06K 9/00* (2013.01); *G06T 7/13* (2017.01); *G06T 7/529* (2017.01); *G06T 7/60* (2013.01); *B64C 2201/141* (2013.01); *B64C 2201/18* (2013.01); *G06T 2207/20024* (2013.01); *G06T 2207/20061* (2013.01); *G06T 2207/30252* (2013.01)

(58) Field of Classification Search
CPC ..... B64C 39/024; B64C 2201/18; G06T 7/13; G06T 7/529; G06T 7/60; G06T 2207/20024; G06T 2207/20061; G06T 2207/30252; B64D 47/08
See application file for complete search history.

(56) References Cited

U.S. PATENT DOCUMENTS

2018/0178665 A1*  6/2018  Chen ............... H02J 7/0044
2018/0208309 A1*  7/2018  Wang ............... B64C 25/56

FOREIGN PATENT DOCUMENTS

WO    WO2017000304    *  5/2017    ........ B64C 39/024

* cited by examiner

*Primary Examiner* — Xin Jia
(74) *Attorney, Agent, or Firm* — Ladas & Parry LLP

(57) ABSTRACT

Embodiments of the present disclosure disclose a water surface detection method, an unmanned aerial vehicle landing method and an unmanned aerial vehicle. The detection method includes: controlling the unmanned aerial vehicle to generate an airflow, where the airflow is used to generate a water surface ripple; obtaining an image of a landing area of the unmanned aerial vehicle and a flight parameter of the unmanned aerial vehicle; and processing the image, and determining, with reference to the flight parameter, whether the landing area has the water surface ripple. Damage caused by erroneous landing of the unmanned aerial vehicle on a water surface can be alleviated by determining whether the landing area has the water surface.

11 Claims, 5 Drawing Sheets

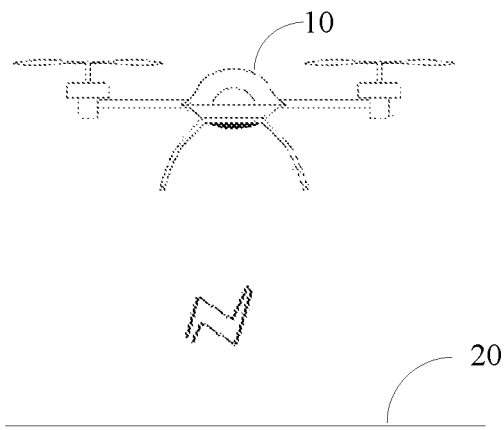

FIG. 1

```
┌─────────────────────────────────────────────────────────┐
│ Control the unmanned aerial vehicle to generate an      │──101
│ airflow, where the airflow is used to generate a water  │
│ surface ripple                                           │
└─────────────────────────────────────────────────────────┘
                           │
┌─────────────────────────────────────────────────────────┐
│ Obtain an image of a landing area of the unmanned       │──102
│ aerial vehicle and a flight parameter of the unmanned   │
│ aerial vehicle                                           │
└─────────────────────────────────────────────────────────┘
                           │
┌─────────────────────────────────────────────────────────┐
│ Process the image, and determine, with reference to     │──103
│ the flight parameter, whether the landing area has the  │
│ water surface ripple                                     │
└─────────────────────────────────────────────────────────┘
```

FIG. 2

WATER SURFACE DETECTION METHOD AND APPARATUS, UNMANNED AERIAL VEHICLE LANDING METHOD AND APPARATUS AND UNMANNED AERIAL VEHICLE

BACKGROUND

Technical Field

Embodiments of the present invention relate to the field of unmanned aerial vehicle technologies, and in particular, to a water surface detection method and apparatus, an unmanned aerial vehicle landing method and apparatus and an unmanned aerial vehicle.

Related Art

With the development of unmanned aerial vehicle technologies, unmanned aerial vehicles are widely used in both military and civil fields. Currently, the unmanned aerial vehicle can already implement the autonomous flight, and can independently accomplish tasks such as reconnoitering, aerial photography and mapping.

In a process of implementing the present invention, the inventor finds that the related art has at least one following problem: Because the unmanned aerial vehicle cannot determine whether a landing destination is a water surface in autonomous landing, the unmanned aerial vehicle easily lands on the water surface by mistake, causing damage to the unmanned aerial vehicle.

SUMMARY

An objective of embodiments of the present invention is to provide a water surface detection method and apparatus, an unmanned aerial vehicle landing method and apparatus and an unmanned aerial vehicle, so that whether a landing destination is a water surface can be determined before an unmanned aerial vehicle lands, thereby reducing damage caused by erroneous landing of the unmanned aerial vehicle on a water surface.

According to a first aspect, an embodiment of the present invention provides a water surface detection method, applied to an unmanned aerial vehicle. The detection method includes:

controlling the unmanned aerial vehicle to generate an airflow, where the airflow is used to generate a water surface ripple;

obtaining an image of a landing area of the unmanned aerial vehicle and a flight parameter of the unmanned aerial vehicle; and processing the image, and determining, with reference to the flight parameter, whether the landing area has the water surface ripple.

According to some embodiment of the present invention, the water surface detection method further includes:

determining whether a flight altitude of the unmanned aerial vehicle is less than a specified altitude; and if the flight altitude of the unmanned aerial vehicle is not less than the specified altitude, controlling the unmanned aerial vehicle to descend until the flight altitude of the unmanned aerial vehicle is less than the specified altitude, so as to ensure that the unmanned aerial vehicle can generate the water surface ripple.

According to some embodiment of the present invention, the processing the image, and determining, with reference to the flight parameter, whether the landing area has the water surface ripple includes:

performing edge detection on the image to obtain a first sub-image;

obtaining a wavelength range of the water surface ripple according to the flight parameter;

filtering the first sub-image according to the wavelength range to obtain a ripple corresponding to the wavelength range;

calculating reliability of the ripple according to a vision algorithm, and determining whether the reliability is greater than a preset threshold; and if the reliability is greater than the preset threshold, determining that the landing area is a water surface.

According to some embodiment of the present invention, the airflow is generated by an airflow generating apparatus of the unmanned aerial vehicle.

According to some embodiment of the present invention, the airflow generating apparatus includes a rotor of the unmanned aerial vehicle.

According to some embodiment of the present invention, the flight parameter includes a flight attitude parameter of the unmanned aerial vehicle and an altitude parameter of the unmanned aerial vehicle.

According to a second aspect, an embodiment of the present invention provides an unmanned aerial vehicle landing method, applied to an unmanned aerial vehicle. The landing method includes:

detecting whether a landing area of the unmanned aerial vehicle has a water surface; and if there is a water surface, controlling the unmanned aerial vehicle to suspend landing and/or controlling the unmanned aerial vehicle to fly away from the landing area.

According to some embodiment of the present invention, the detecting whether a landing area of the unmanned aerial vehicle has a water surface includes:

controlling the unmanned aerial vehicle to generate an airflow, where the airflow is used to generate a water surface ripple;

obtaining an image of the landing area of the unmanned aerial vehicle and a flight parameter of the unmanned aerial vehicle; and processing the image, and determining, with reference to the flight parameter, whether the landing area has the water surface ripple.

According to some embodiment of the present invention, the water surface detection method further includes:

determining whether a flight altitude of the unmanned aerial vehicle is less than a specified altitude; and if the flight altitude of the unmanned aerial vehicle is not less than the specified altitude, controlling the unmanned aerial vehicle to descend until the flight altitude of the unmanned aerial vehicle is less than the specified altitude, so as to ensure that the unmanned aerial vehicle can generate the water surface ripple.

According to some embodiment of the present invention, the processing the image, and determining, with reference to the flight parameter, whether the landing area has the water surface ripple includes:

performing edge detection on the image to obtain a first sub-image;

obtaining a wavelength range of the water surface ripple according to the flight parameter;

filtering the first sub-image according to the wavelength range to obtain a ripple corresponding to the wavelength range;

calculating reliability of the ripple according to a vision algorithm, and determining whether the reliability is greater than a preset threshold; and if the reliability is greater than the preset threshold, determining that the landing area is a water surface.

According to some embodiment of the present invention, the airflow is generated by an airflow generating apparatus of the unmanned aerial vehicle.

According to some embodiment of the present invention, the airflow generating apparatus includes a rotor of the unmanned aerial vehicle.

According to some embodiment of the present invention, the flight parameter includes a flight attitude parameter of the unmanned aerial vehicle and an altitude parameter of the unmanned aerial vehicle.

According to a third aspect, an embodiment of the present invention provides an unmanned aerial vehicle, including a body and an image collection apparatus connected to the body. The unmanned aerial vehicle further includes:

air airflow generating apparatus, configured to generate an airflow, where the airflow is used to generate a water surface ripple;

a flight control chip, where the flight control chip is configured to obtain an image that is of a landing area of the unmanned aerial vehicle and collected by the image collection apparatus and a flight parameter of the unmanned aerial vehicle; and a vision chip, configured to: perform image processing on the image that is of the landing area and collected by the image collection apparatus, and determine, with reference to the flight parameter obtained by the flight control chip, whether the landing area has the water surface ripple.

According to some embodiment of the present invention, the flight control chip is further configured to:

determine whether a flight altitude of the unmanned aerial vehicle is less than a specified altitude; and if the flight altitude of the unmanned aerial vehicle is not less than the specified altitude, control the unmanned aerial vehicle to descend until the flight altitude of the unmanned aerial vehicle is less than the specified altitude, so as to ensure that the unmanned aerial vehicle can generate the water surface ripple.

According to some embodiment of the present invention, the vision chip is specifically configured to:

perform edge detection on the image to obtain a first sub-image;

obtain a wavelength range of the water surface ripple according to the flight parameter;

filter the first sub-image according to the wavelength range to obtain a ripple corresponding to the wavelength range;

calculate reliability of the ripple according to a vision algorithm, and determine whether the reliability is greater than a preset threshold; and if the reliability is greater than the preset threshold, determine that the landing area is a water surface.

According to some embodiment of the present invention, the airflow is generated by the airflow generating apparatus of the unmanned aerial vehicle.

According to some embodiment of the present invention, the airflow generating apparatus includes a rotor of the unmanned aerial vehicle.

According to some embodiment of the present invention, the flight parameter includes a flight attitude parameter of the unmanned aerial vehicle and an altitude parameter of the unmanned aerial vehicle.

According to a fourth aspect, an embodiment of the present invention provides an unmanned aerial vehicle, including a memory and a processor, where the memory stores a computer program, and when the computer program is executed by the processor, the processor is enabled to perform the foregoing method.

According to a fifth aspect, an embodiment of the present invention provides a non-volatile computer-readable storage medium, where the computer-readable storage medium stores a computer-executable instruction, and when the computer-executable instruction is executed by the unmanned aerial vehicle, the unmanned aerial vehicle is enabled to perform the foregoing method.

According to an sixth aspect, an embodiment of the present invention provides a computer program product, where the computer program product includes a computer program stored in a non-volatile computer-readable storage medium, the computer program including a program instruction, and when the program instruction is executed by an unmanned aerial vehicle, the unmanned aerial vehicle is enabled to perform the foregoing method.

BRIEF DESCRIPTION OF THE DRAWINGS

One or more embodiments are exemplarily described by using figures that are corresponding thereto in the accompanying drawings. The exemplary descriptions do not constitute a limitation to the embodiments. Elements with a same reference numeral in the accompanying drawings represent similar elements unless otherwise particularly stated, the figures in the accompanying drawings constitute no proportional limitation.

FIG. 1 is a schematic diagram of an application scenario of a water surface detection method and apparatus and an unmanned aerial vehicle landing method and apparatus that are provided in embodiments of the present invention;

FIG. 2 is a schematic flowchart of an embodiment of a water surface detection method according to the present invention;

DETAILED DESCRIPTION

Figure 3:
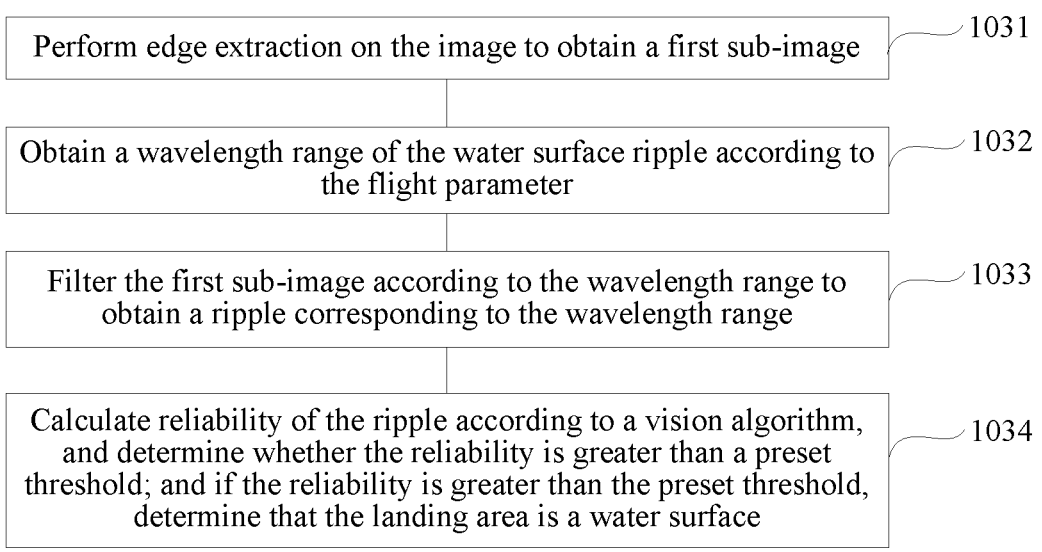
FIG. 3 is a schematic flowchart of an embodiment of a water surface detection method according to the present invention.

To make the objectives, technical solutions, and advantages of embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

A water surface detection method and apparatus and an unmanned aerial vehicle landing method and apparatus that are provided in the embodiments of the present invention are applicable to an application scenario shown in FIG. 1. The application scenario includes an unmanned aerial vehicle 10 and a landing area 20. The method and the apparatus that are provided in the embodiments of the present invention may be applied to an occasion, when autonomous landing is required, in an autonomous flight process of the unmanned aerial vehicle 10. During autonomous landing, the unmanned aerial vehicle 10 needs to determine whether the landing area 20 has a water surface. If the landing area 20 has a water surface, the unmanned aerial vehicle 10 cannot land. Otherwise, the unmanned aerial vehicle is damaged.

The unmanned aerial vehicle 10 may be a high-altitude or low-altitude aerial vehicle of any suitable type, including a typical four-axis aerial vehicle, a remote-controlled helicopter capable of hovering or the like. The unmanned aerial vehicle 10 may be provided with an airflow generating apparatus (for example, a rotor of the unmanned aerial vehicle), which is configured to generate an airflow. In this way, when the landing area 20 has a water surface, the airflow generates a ripple on the water surface. The unmanned aerial vehicle 10 is provided with at least one image collection apparatus, for example, a high definition camera or a moving camera. The image collection apparatus may collect an image of the landing area 20 below the unmanned aerial vehicle 10. The unmanned aerial vehicle 10 processes and identifies the image. If it is determined that the image has a water surface ripple, it may be determined that the landing area 20 below the unmanned aerial vehicle 10 has a water surface. The unmanned aerial vehicle 10 suspends landing, to avoid being damaged.

FIG. 2 is a schematic flowchart of a water surface detection method according to an embodiment of the present invention. The method may be executed by the unmanned aerial vehicle 10 in FIG. 1. As shown in FIG. 2, the detection method includes:

Step 101: Control the unmanned aerial vehicle 10 to generate an airflow, where the airflow is used to generate a water surface ripple.

An airflow generating apparatus of the unmanned aerial vehicle 10 may be controlled, so that the unmanned aerial vehicle 10 generates the airflow. For example, a rotor of the unmanned aerial vehicle 10 is kept in an operating state, so as to generate the airflow. When a landing area 20 of the unmanned aerial vehicle 10 has a water surface, the airflow generates a water surface ripple on the water surface, in this way, the water surface can be distinguished from a general mirror surface. On the unmanned aerial vehicle 10, a fan apparatus may further be disposed on a lower part of the unmanned aerial vehicle 10 to generate the airflow. In comparison, costs are lower because the airflow is generated by using the existing rotor of the unmanned aerial vehicle 10, and no additional airflow generating apparatus needs to be disposed.

According to some embodiment of the present invention, the unmanned aerial vehicle 10 may further determine whether a flight altitude of the unmanned aerial vehicle 10 is less than a specified altitude, and if the flight altitude is not less than the specified altitude, the unmanned aerial vehicle 10 is controlled to descend until the flight altitude of the unmanned aerial vehicle 10 is less than the specified altitude, so as to ensure that the unmanned aerial vehicle 10 can generate the water surface ripple. A value of the specified altitude may be set according to an experience value. At the altitude, the unmanned aerial vehicle 10 may generate a strong enough airflow, so that the airflow can generate an obvious ripple on the water surface within the landing area 20.

102: Obtain an image of the landing area 20 of the unmanned aerial vehicle 10 and a flight parameter of the unmanned aerial vehicle 10.

The image of the landing area 20 of the unmanned aerial vehicle 10 may be obtained by using an image collection apparatus of the unmanned aerial vehicle 10. The flight parameter includes an altitude parameter of the unmanned aerial vehicle 10 and a flight attitude parameter, for example, an included angle between a flight direction of the unmanned aerial vehicle 10 and the horizontal plane.

103: Process the image, and determine, with reference to the flight parameter, whether the landing area 20 has the water surface ripple.

In some embodiments, as shown in FIG. 3, step 103 further includes:

Step 1031: Perform edge detection on the image to obtain a first sub-image.

An edge is an area where an image grayscale varies most in a grayscale image (that is, an area where an image grayscale value varies most dramatically), and is caused by discontinuous changes of the image grayscale on a surface normal. Edge detection is to reserve the area, where the grayscale varies dramatically, in the grayscale image. An image including a person is used as an example. The edge is the contour of the person. Only the contour of the person is reserved in the image after edge detection is performed. During edge detection, edge detection calculation may be performed by using an existing edge algorithm (for example, an OpenCV algorithm) and through an operator template (for example, a Robert operator or a canny operator). Edge detection needs to be performed based on a grayscale image. If the image collection apparatus collects a color image, the color image needs to be converted into a grayscale image in advance.

Step 1032: Obtain a wavelength range of the water surface ripple according to the flight parameter.

A wavelength of the water surface ripple is related to an altitude of the unmanned aerial vehicle 10, the included angle between the flight direction of the unmanned aerial vehicle 10 and the horizontal plane and strength of the airflow generated by the unmanned aerial vehicle 10. When the rotor of the unmanned aerial vehicle 10 is used to generate the airflow, the wavelength is related to the rotational speed of the rotor, the mass of the rotor and the like of the unmanned aerial vehicle 10. The wavelength range of the water surface ripple may be estimated by using one or more of the foregoing factors. For example, because the altitude of the unmanned aerial vehicle 10 is a key factor, the wavelength range of the water surface ripple may be estimated only according to the altitude of the unmanned aerial vehicle 10. Specifically, an experiment of making the unmanned aerial vehicle 10 generate airflows at different altitudes may be conducted. A wavelength range of a water surface ripple corresponding to each altitude range is recorded. A correspondence between the altitude range and the wavelength range is prestored in the unmanned aerial vehicle 10. After obtaining the altitude value, the unmanned aerial vehicle 10 may obtain the wavelength range of the water surface ripple by means of estimation.

Step 1033: Filter the first sub-image according to the wavelength range to obtain a ripple corresponding to the wavelength range.

After the wavelength range is obtained, the first sub-image may be filtered according to the wavelength range. Specifically, the ripple that satisfies the wavelength range is reserved and a ripple that does not satisfy the wavelength range is filtered out by using a band-pass filter (which allows only a particular wavelength to pass). In this way, the subsequent calculation amount may be reduced, improving the operation speed.

Step 1034: Calculate reliability of the ripple according to a vision algorithm, and determine whether the reliability is greater than a preset threshold; and if the reliability is greater than the preset threshold, determine that the landing area is a water surface.

That is, the filtered first sub-image is searched for a ripple center. Specifically, the ripple center may be searched for based on the Hough transform algorithm of the vision algorithm. Then, texture identification is performed according to the ripple center, to calculate the reliability of the ripple. If the reliability is greater than the preset threshold, it is determined that the landing area 20 below the unmanned aerial vehicle 10 has a water surface; otherwise, it is determined that the landing area 20 does not have a water surface.

Because when the unmanned aerial vehicle 10 is parallel to the horizontal plane, it is more convenient to search for the ripple center. Therefore, in some embodiments of the method, before the image of the landing area of the unmanned aerial vehicle 10 and the flight parameter of the unmanned aerial vehicle 10 are obtained, the method further includes:

making the flight direction of the unmanned aerial vehicle 10 parallel to the horizontal plane.

In this embodiment of the present invention, the unmanned aerial vehicle 10 is enabled to generate the airflow. When the landing area has a water surface, the airflow generates a ripple on the water surface. Then, the image of the landing area and the flight parameter of the unmanned aerial vehicle are obtained. The image is processed and identified. Whether the landing area has a water surface is determined with reference to the flight parameter. Damage caused by erroneous landing of the unmanned aerial vehicle 10 on a water surface can be alleviated by determining whether the landing area has the water surface.

Figure 4:
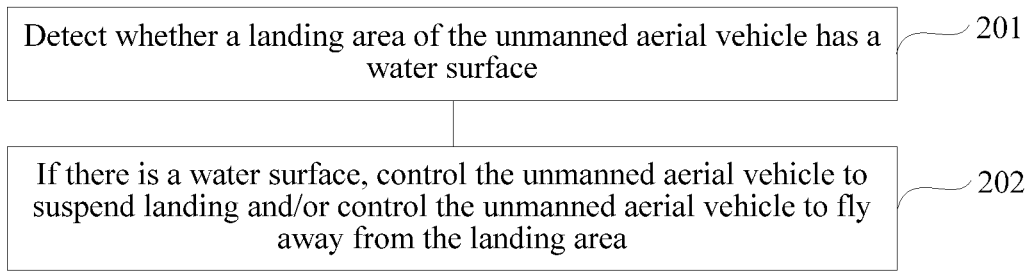
FIG. 4 is a schematic flowchart of an embodiment of a water surface detection method according to the present invention.

An embodiment of the present invention further provides an unmanned aerial vehicle landing method, which may be executed by the unmanned aerial vehicle 10 in FIG. 1. As shown in FIG. 4, the landing method includes:

Step 201: Detect whether a landing area 20 of the unmanned aerial vehicle 10 has a water surface.

Whether the landing area 20 of the unmanned aerial vehicle 10 has a water surface may be detected by using the water surface detection method described in any of the foregoing embodiments.

Step 202: if there is a water surface, control the unmanned aerial vehicle to suspend landing and/or control the unmanned aerial vehicle to fly away from the landing area.

If the landing area 20 has a water surface, the unmanned aerial vehicle 10 is made to suspend landing. Otherwise, the unmanned aerial vehicle may be made to land.

Figure 5:
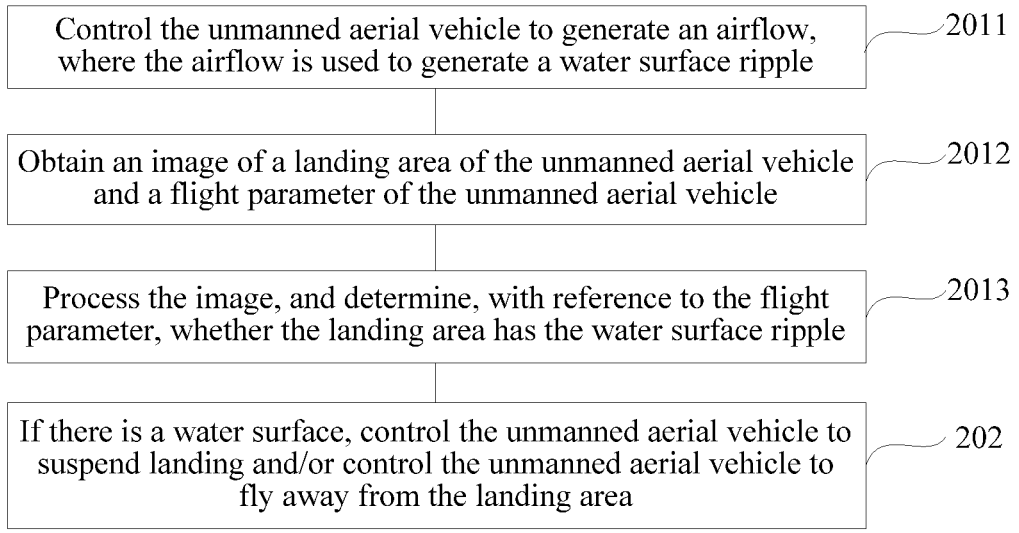
FIG. 5 is a schematic flowchart of an embodiment of an unmanned aerial vehicle landing method according to the present invention.

Specifically, in some embodiments of the landing method, as shown in FIG. 5, the detecting whether the landing area of the unmanned aerial vehicle has a water surface includes:

Step 2011: Control the unmanned aerial vehicle to generate an airflow, where the airflow is used to generate a water surface ripple.

Step 2012: Obtain an image of the landing area of the unmanned aerial vehicle and a flight parameter of the unmanned aerial vehicle.

Step 2013: Process the image, and determine, with reference to the flight parameter, whether the landing area has the water surface ripple.

According to some embodiment of the present invention, the water surface detection method further includes:

determining whether a flight altitude of the unmanned aerial vehicle is less than a specified altitude; and if the flight altitude of the unmanned aerial vehicle is not less than the specified altitude, controlling the unmanned aerial vehicle to descend until the flight altitude of the unmanned aerial vehicle is less than the specified altitude, so as to ensure that the unmanned aerial vehicle can generate the water surface ripple.

According to some embodiment of the present invention, the processing the image, and determining, with reference to the flight parameter, whether the landing area has the water surface ripple includes:

performing edge detection on the image to obtain a first sub-image;

obtaining a wavelength range of the water surface ripple according to the flight parameter;

filtering the first sub-image according to the wavelength range to obtain a ripple corresponding to the wavelength range;

calculating reliability of the ripple according to a vision algorithm, and determining whether the reliability is greater than a preset threshold; and if the reliability is greater than the preset threshold, determining that the landing area is a water surface.

According to some embodiment of the present invention, the airflow is generated by an airflow generating apparatus of the unmanned aerial vehicle.

According to some embodiment of the present invention, the airflow generating apparatus includes a rotor of the unmanned aerial vehicle.

According to some embodiment of the present invention, the flight parameter includes a flight attitude parameter of the unmanned aerial vehicle and an altitude parameter of the unmanned aerial vehicle.

In various embodiments of the landing method, for specific technical details of the water surface detection method, reference may be made to the foregoing description of the water surface detection method. Details are not described herein again.

Figure 6:
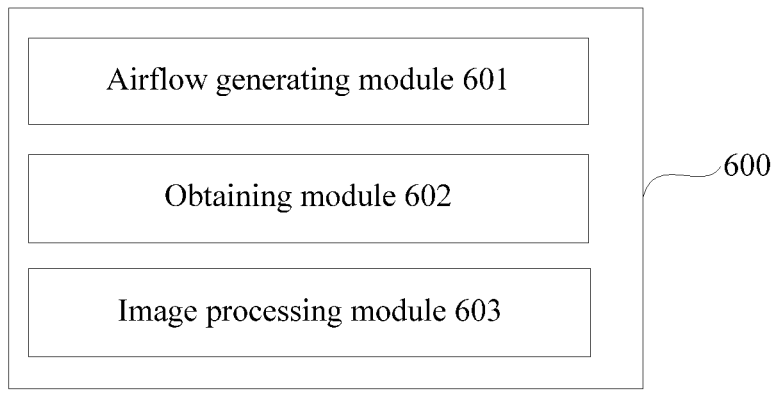
FIG. 6 is a schematic structural diagram of an embodiment of a water surface detection apparatus according to the present invention.

Correspondingly, an embodiment of the present invention further provides a water surface detection apparatus, applied to the unmanned aerial vehicle 10 in FIG. 1. As shown in FIG. 6, the detection apparatus 600 includes:

an airflow generating module 601, configured to control the unmanned aerial vehicle to generate an airflow, where the airflow is used to generate a water surface ripple;

an obtaining module 602, configured to obtain an image of a landing area of the unmanned aerial vehicle and a flight parameter of the unmanned aerial vehicle; and an image processing module 603, configured to determine, according to the image of the landing area of the unmanned aerial vehicle and the flight parameter of the unmanned aerial vehicle that are obtained by the obtaining module, whether the landing area has the water surface ripple.

In this embodiment of the present invention, the unmanned aerial vehicle 10 is enabled to generate the airflow. When the landing area has a water surface, the airflow generates a ripple on the water surface. Then, the image of the landing area and the flight parameter of the unmanned aerial vehicle are obtained. The image is processed and identified. Whether the landing area has a water surface is determined combining with the flight parameter. Damage caused by erroneous landing of the unmanned aerial vehicle 10 on a water surface can be alleviated by determining whether the landing area has the water surface.

Figure 7:
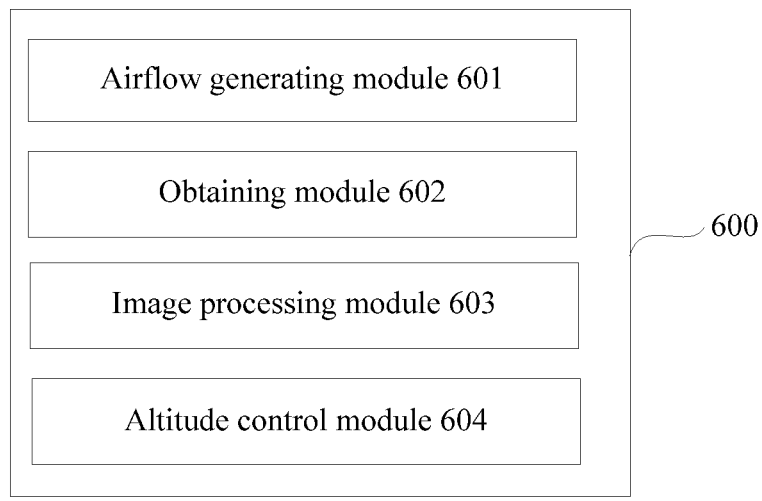
FIG. 7 is a schematic structural diagram of an embodiment of a water surface detection apparatus according to the present invention.

According to some embodiment of the present invention, as shown in FIG. 7, the apparatus 600 further includes:

an altitude control module 604, configured to: determine whether a flight altitude of the unmanned aerial vehicle is less than a specified altitude, and if the flight altitude of the unmanned aerial vehicle is not less than the specified altitude, control the unmanned aerial vehicle to descend until the flight altitude of the unmanned aerial vehicle is less than the specified altitude, so as to ensure that the unmanned aerial vehicle can generate the water surface ripple.

According to some embodiment of the present invention, the image processing module 603 is specifically configured to:

perform edge detection on the image to obtain a first sub-image;

obtain a wavelength range of the water surface ripple according to the flight parameter;

filter the first sub-image according to the wavelength range to obtain a ripple corresponding to the wavelength range;

calculate reliability of the ripple according to a vision algorithm, and determine whether the reliability is greater than a preset threshold; and if the reliability is greater than the preset threshold, determine that the landing area is a water surface.

According to some embodiment of the present invention, the airflow is generated by an airflow generating apparatus of the unmanned aerial vehicle.

According to some embodiment of the present invention, the airflow generating apparatus includes a rotor of the unmanned aerial vehicle.

According to some embodiment of the present invention, the flight parameter includes a flight attitude parameter of the unmanned aerial vehicle and an altitude parameter of the unmanned aerial vehicle.

It should be noted that the foregoing water surface detection apparatus may execute the water surface detection method provided in the embodiments of the present application, and has a corresponding function module and the beneficial effect for executing the water surface detection method. For technical details that are not described in detail in the embodiment of the water surface detection apparatus, reference may be made to the water surface detection method provided in the embodiments of the present application.

Figure 8:
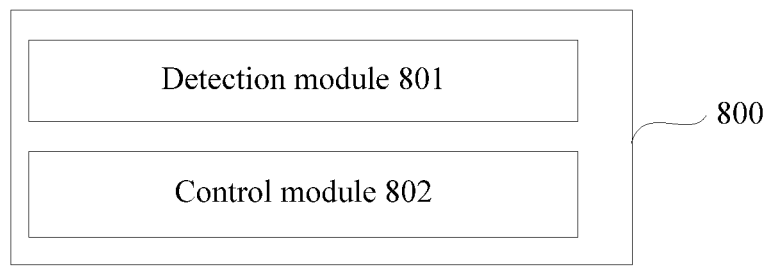
FIG. 8 is a schematic structural diagram of an embodiment of a landing apparatus according to the present invention.

Correspondingly, an embodiment of the present invention further provides an unmanned aerial vehicle landing apparatus, applied to the unmanned aerial vehicle 10 in FIG. 1. As shown in FIG. 8, the landing apparatus 800 includes:

a detection module 801, configured to detect whether a landing area of the unmanned aerial vehicle has a water surface; and a control module 802, configured to: if there is a water surface, control the unmanned aerial vehicle to suspend landing and/or control the unmanned aerial vehicle to fly away from the landing area.

In this embodiment of the present invention, the unmanned aerial vehicle 10 is enabled to generate the airflow. When the landing area has a water surface, the airflow generates a ripple on the water surface. Then, the image of the landing area and the flight parameter of the unmanned aerial vehicle are obtained. The image is processed and identified. Whether the landing area has a water surface is determined with reference to the flight parameter. Damage caused by erroneous landing of the unmanned aerial vehicle 10 on a water surface can be alleviated by determining whether the landing area has the water surface.

Figure 9:
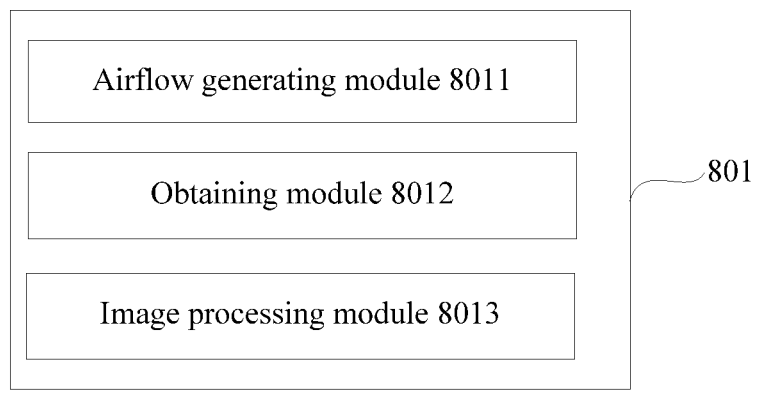
FIG. 9 is a schematic structural diagram of an embodiment of a detection module s according to the present invention.

According to some embodiment of the present invention, as shown in FIG. 9, the detection module 801 includes:

an airflow generating module 8011, configured to generate an airflow, where the airflow is used to generate a water surface ripple;

an obtaining module 8012, configured to obtain an image of the landing area of the unmanned aerial vehicle and a flight parameter of the unmanned aerial vehicle; and an image processing module 8013, configured to determine, according to the image of the landing area of the unmanned aerial vehicle and the flight parameter of the unmanned aerial vehicle that are obtained by the obtaining module, whether the landing area has the water surface ripple.

Figure 10:
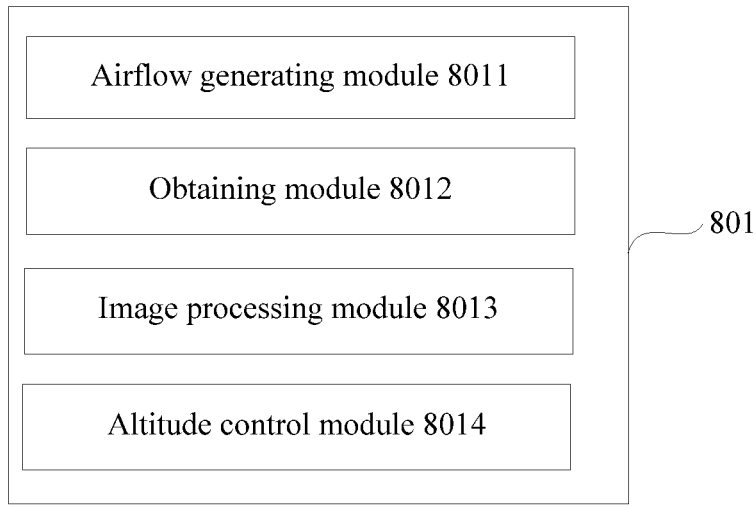
FIG. 10 is a schematic structural diagram of another embodiment of a detection module s according to the present invention.

According to some embodiment of the present invention, as shown in FIG. 10, the detection module 801 further includes:

an altitude control module 8014, configured to: determine whether a flight altitude of the unmanned aerial vehicle is less than a specified altitude, and if the flight altitude of the unmanned aerial vehicle is not less than the specified altitude, control the unmanned aerial vehicle to descend until the flight altitude of the unmanned aerial vehicle is less than the specified altitude, so as to ensure that the unmanned aerial vehicle can generate the water surface ripple.

According to some embodiment of the present invention, the image processing module 8013 is specifically configured to:

perform edge detection on the image to obtain a first sub-image;

obtain a wavelength range of the water surface ripple according to the flight parameter;

filter the first sub-image according to the wavelength range to obtain a ripple corresponding to the wavelength range;

calculate reliability of the ripple according to a vision algorithm, and determine whether the reliability is greater than a preset threshold; and if the reliability is greater than the preset threshold, determine that the landing area is a water surface.

According to some embodiment of the present invention, the airflow is generated by an airflow generating apparatus of the unmanned aerial vehicle.

According to some embodiment of the present invention, the airflow generating apparatus includes a rotor of the unmanned aerial vehicle.

According to some embodiment of the present invention, the flight parameter includes a flight attitude parameter of the unmanned aerial vehicle and an altitude parameter of the unmanned aerial vehicle.

It should be noted that the foregoing unmanned aerial vehicle landing apparatus may execute the unmanned aerial vehicle landing method provided in the embodiments of the present application, and has a corresponding function module and the beneficial effect for executing the unmanned aerial vehicle landing method. For technical details that are not described in detail in the embodiment of the landing apparatus, reference may be made to the landing method provided in the embodiments of the present application.

Figure 11:
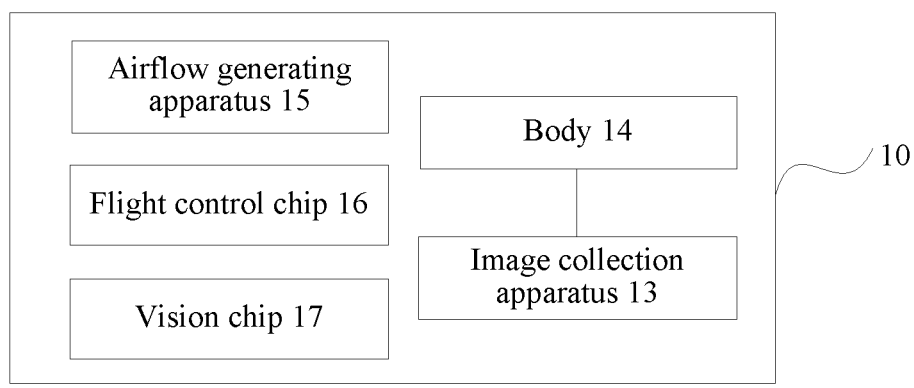
FIG. 11 is a schematic structural diagram of an unmanned aerial vehicle according to an embodiment of the present invention.

FIG. 11 is a schematic structural diagram of hardware of an unmanned aerial vehicle 10 according to an embodiment of the present invention. As shown in FIG. 11, the unmanned aerial vehicle 10 includes a body 14 and an image collection apparatus 13 connected to the body 14. The unmanned aerial vehicle 10 further includes:

an airflow generating apparatus 15, configured to generate an airflow, where the airflow is used to generate a water surface ripple;

a flight control chip 16, where the flight control chip is configured to obtain an image that is of a landing area of the unmanned aerial vehicle and collected by the image collection apparatus and a flight parameter of the unmanned aerial vehicle; and a vision chip 1 configured to: perform image processing on the image that is of the landing area and collected by the image collection apparatus, and determine, with reference to the flight parameter obtained by the flight control chip, whether the landing area has the water surface ripple.

In this embodiment of the present invention, the unmanned aerial vehicle 10 is enabled to generate the airflow. When the landing area has a water surface, the airflow generates a ripple on the water surface. Then, the image of the landing area and the flight parameter of the unmanned aerial vehicle are obtained. The image is processed and identified. Whether the landing area has a water surface is determined with reference to the flight parameter. Damage caused by erroneous landing of the unmanned aerial vehicle 10 on a water surface can be alleviated by determining whether the landing area has the water surface.

According to some embodiment of the present invention, the flight control chip 16 is further configured to:

determine whether a flight altitude of the unmanned aerial vehicle is less than a specified altitude; and if the flight altitude of the unmanned aerial vehicle is not less than the specified altitude, control the unmanned aerial vehicle to descend until the flight altitude of the unmanned aerial vehicle is less than the specified altitude, so as to ensure that the unmanned aerial vehicle can generate the water surface ripple.

According to some embodiment of the present invention, the vision chip 17 is specifically configured to:

perform edge detection on the image to obtain a first sub-image;

obtain a wavelength range of the water surface ripple according to the flight parameter;

filter the first sub-image according to the wavelength range to obtain a ripple corresponding to the wavelength range;

calculate reliability of the ripple according to a vision algorithm, and determine whether the reliability is greater than a preset threshold; and if the reliability is greater than the preset threshold, determine that the landing area is a water surface.

According to some embodiment of the present invention, the airflow is generated by the airflow generating apparatus 15 of the unmanned aerial vehicle.

According to some embodiment of the present invention, the airflow generating apparatus includes a rotor of the unmanned aerial vehicle.

According to some embodiment of the present invention, the flight parameter includes a flight attitude parameter of the unmanned aerial vehicle and an altitude parameter of the unmanned aerial vehicle.

It should be noted that the foregoing unmanned aerial vehicle 10 may execute the water surface detection method and the unmanned aerial vehicle landing method that are provided in the embodiments of the present application, and has corresponding function modules and the beneficial effects for executing the water surface detection method and the unmanned aerial vehicle landing method. For technical details that are not described in detail in the embodiment of the unmanned aerial vehicle, reference may be made to the detection method and the landing method that are provided in the embodiments of the present application.

Figure 12:
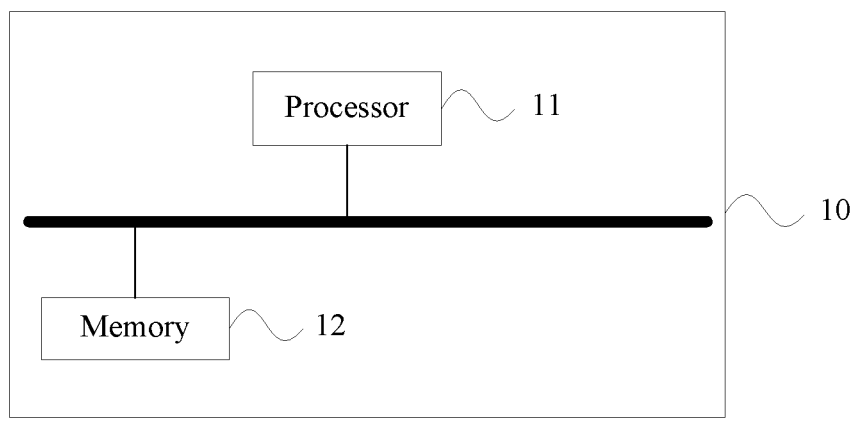
FIG. 12 is a schematic structural diagram of an unmanned aerial vehicle according to an embodiment of the present invention.

FIG. 12 is a schematic structural diagram of hardware of an unmanned aerial vehicle 10 according to an embodiment of the present invention. As shown in FIG. 12, the unmanned aerial vehicle 10 includes a processor 11 and a memory 12.

The processor 11 and the memory 12 may be connected by using a bus or in another manner.

The memory 12, as a non-volatile computer-readable storage medium, may be configured to store non-volatile software programs and non-volatile computer-executable programs and modules, for example, program instructions/units (for example, the detection module 801 and the control module 802 shown in FIG. 8) corresponding to the methods in the embodiments of the present invention. The processor 11 runs the non-volatile software programs, instructions and units stored in the memory 12, to execute various functional applications and data processing of the unmanned aerial vehicle 10, that is, to implement the water surface detection method or the unmanned aerial vehicle landing method in the foregoing method embodiments.

The memory 12 may include a program storage area and a data storage area. The program storage area may store an operating system and an application program that is required by at least one function. The data storage area may store data created according to use of a user terminal device and the like. In addition, the memory 12 may include a high-speed random access memory, and may further include a non-volatile memory such as at least one disk storage device, a flash memory device, or other non-volatile solid-state storage devices. In some embodiments, the memory 12 optionally includes memories disposed remote to the processor 11. The remote memories may be connected to the unmanned aerial vehicle 10 by using a network.

The one or more modules are stored in the memory 12, and execute the water surface detection method or the unmanned aerial vehicle landing method in any of the foregoing method embodiments when being executed by the one or more processors 11. For example, step 101 to step 103 of the method in FIG. 2 described above, step 1031 to step 1034 of the method in FIG. 3, step 201 and step 202 of the method in FIG. 4 and step 2011 to step 2014 of the method in FIG. 5 are performed, and the functions of the modules 601 to 603 in FIG. 6, the modules 601 to 604 in FIG. 7, the modules 801 to 802 in FIG. 8, the modules 8011 to 8013 in FIG. 9 and the modules 8011 to 8014 in FIG. 10 are implemented.

The unmanned aerial vehicle 10 may execute the water surface detection method or the unmanned aerial vehicle landing method provided in the embodiments of the present invention, and has a corresponding function module and the beneficial effect for executing the method. For technical details that are not described in detail in the embodiment of the unmanned aerial vehicle 10, reference may be made to the methods provided in the embodiments of the present invention.

An embodiment of the present invention provides a non-volatile computer-readable storage medium. The computer-readable storage medium stores a computer-executable instruction. The computer-executable instruction is executed by one or more processors. For example, step 101 to step 103 of the method in FIG. 2 described above, step 1031 to step 1034 of the method in FIG. 3, step 201 and step 202 of the method in FIG. 4 and step 2011 to step 2014 of the method in FIG. 5 are performed, and the functions of the modules 601 to 603 in FIG. 6, the modules 601 to 604 in FIG. 7, the modules 801 and 802 in FIG. 8, the modules 8011 to 8013 in FIG. 9 and the modules 8011 to 8014 in FIG. 10 are implemented.

The apparatus embodiments described above are merely exemplary. The units described as separate components may be or may not be physically separated, and the components displayed as units may be or may not be physical units. That is, the units or components may be located at one place or scattered on several network units. Some or all of the modules may be selected according to actual requirements to achieve the objectives of the solutions of the embodiments.

From the description of the embodiments, persons of ordinary skill in the art may clearly understand that the embodiments may be implemented by using software plus a universal hardware platform, and certainly, may be implemented by using hardware. Persons of ordinary skill in the art may understand that all or some of the processes of the methods in the foregoing embodiments may be implemented by a computer program instructing relevant hardware. The program may be stored in a computer-readable storage medium. When the program is executed, processes of the foregoing method embodiments may be performed. The storage medium may be a magnetic disk, an optical disk, a read-only memory (ROM), a random access memory (RAM) and the like.

Finally, it should be noted that the foregoing embodiments are merely used to describe the technical solutions of the present invention, but are not intended to limit the technical solutions of the present invention. Based on the idea of the present invention, the technical features in the foregoing embodiments or different embodiments may be combined, the steps may be performed in any sequence, and there are many other changes of different aspects of the present invention described above. For brevity, the changes are not mentioned in the details. Although the present invention is described in detail with reference to the foregoing embodiments, persons of ordinary skill in the art should understand that they may still modify the technical solutions recorded in the foregoing embodiments, or make equivalent replacements on some technical features. The modifications or replacements do not make the corresponding technical solutions essentially depart from the scope of the technical solutions of the embodiments of the present invention.

What is claimed is:

1. A water surface detection method, applied to an unmanned aerial vehicle, wherein the detection method comprises:
   controlling the unmanned aerial vehicle to generate an airflow, wherein the airflow is used to generate a water surface ripple;
   obtaining an image of a landing area of the unmanned aerial vehicle and a flight parameter of the unmanned aerial vehicle; and
   processing the image, and determining, with reference to the flight parameter, whether the landing area has the water surface ripple;
   wherein the processing the image, and determining, with reference to the flight parameter, whether the landing area has the water surface ripple comprises:
   performing edge detection on the image to obtain a first sub-image;
   obtaining a wavelength range of the water surface ripple according to the flight parameter;
   filtering the first sub-image according to the wavelength range to obtain a ripple corresponding to the wavelength range;
   calculating reliability of the ripple according to a vision algorithm and determining whether the reliability is greater than a preset threshold; and
   if the reliability is greater than the preset threshold, determining that the landing area is a water surface.

2. The water surface detection method according to claim 1, wherein the water surface detection method further comprises:
   determining whether a flight altitude of the unmanned aerial vehicle is less than a specified altitude; and
   if the flight altitude of the unmanned aerial vehicle is not less than the specified altitude, controlling the unmanned aerial vehicle to descend until the flight altitude of the unmanned aerial vehicle is less than the specified altitude, so as to ensure that the unmanned aerial vehicle can generate the water surface ripple.

3. The water surface detection method according to any of claim 1, wherein the airflow is generated by an airflow generating apparatus of the unmanned aerial vehicle.

4. The water surface detection method according to claim 3, wherein the airflow generating apparatus comprises a rotor of the unmanned aerial vehicle.

5. The water surface detection method according to any of claim 1, wherein the flight parameter comprises a flight attitude parameter of the unmanned aerial vehicle and an altitude parameter of the unmanned aerial vehicle.

6. The water surface detection method according to claim 1, further comprising:
   if the landing area has the water surface ripple, controlling the unmanned aerial vehicle to suspend landing and/or controlling the unmanned aerial vehicle to fly away from the landing area.

7. An unmanned aerial vehicle, comprising a body and an image collection apparatus connected to the body, wherein the unmanned aerial vehicle further comprises:
   an airflow generating apparatus, configured to generate an airflow, wherein the airflow is used to generate a water surface ripple;
   a flight control chip, wherein the flight control chip is configured to obtain an image that is of a landing area of the unmanned aerial vehicle and collected by the image collection apparatus and a flight parameter of the unmanned aerial vehicle; and a vision chip, configured to: perform image processing on the image that is of the landing area and collected by the image collection apparatus, and determine, with reference to the flight parameter obtained by the flight control chip, whether the landing area has the water surface ripple;

wherein the vision chip is specifically configured to:

perform edge detection on the image to obtain a first sub-image;

obtain a wavelength range of the water surface ripple according to the flight parameter;

filter the first sub-image according to the wavelength range to obtain a ripple corresponding to the wavelength range;

calculate reliability of the ripple according to a vision algorithm, and determine whether the reliability is greater than a preset threshold; and if the reliability is greater than the preset threshold, determine that the landing area is a water surface.

8. The unmanned aerial vehicle according to claim 7, wherein the flight control chip is further configured to:

determine whether a flight altitude of the unmanned aerial vehicle is less than a specified altitude; and if the flight altitude of the unmanned aerial vehicle is not less than the specified altitude, control the unmanned aerial vehicle to descend until the flight altitude of the unmanned aerial vehicle is less than the specified altitude, so as to ensure that the unmanned aerial vehicle can generate the water surface ripple.

9. The unmanned aerial vehicle according to any of claim 7, wherein the airflow is generated by the airflow generating apparatus of the unmanned aerial vehicle.

10. The unmanned aerial vehicle according to claim 9, wherein the airflow generating apparatus comprises a rotor of the unmanned aerial vehicle.

11. The unmanned aerial vehicle according to any of claim 7, wherein the flight parameter comprises a flight attitude parameter of the unmanned aerial vehicle and an altitude parameter of the unmanned aerial vehicle.

* * * * *